(12) United States Patent
Cho

(10) Patent No.: US 11,930,429 B2
(45) Date of Patent: Mar. 12, 2024

(54) NON-CONTACT LAUNDRY SERVICE SYSTEM, AND SERVICE-PROVIDING METHOD

(71) Applicant: LIFEGOESON COMPANY CORP., Seoul (KR)

(72) Inventor: Sungwoo Cho, Seoul (KR)

(73) Assignee: LIFEGOESON COMPANY CORP., Seoul (KR)

( * ) Notice: Subject to any disclaimer, the term of this patent is extended or adjusted under 35 U.S.C. 154(b) by 371 days.

(21) Appl. No.: 17/415,616

(22) PCT Filed: Dec. 17, 2019

(86) PCT No.: PCT/KR2019/017879
§ 371 (c)(1),
(2) Date: Jun. 17, 2021

(87) PCT Pub. No.: WO2020/130572
PCT Pub. Date: Jun. 25, 2020

(65) Prior Publication Data
US 2022/0141628 A1    May 5, 2022

(30) Foreign Application Priority Data

Dec. 18, 2018  (KR) .......... 10-2018-0164375
Dec. 5, 2019   (KR) .......... 10-2019-0161020

(51) Int. Cl.
*H04W 4/24*    (2018.01)
*G06Q 50/28*   (2012.01)
*H04W 4/20*    (2018.01)
*H04W 4/50*    (2018.01)

(52) U.S. Cl.
CPC .............. *H04W 4/20* (2013.01); *G06Q 50/28* (2013.01); *H04W 4/24* (2013.01); *H04W 4/50* (2018.02)

(58) Field of Classification Search
CPC .................... H04W 4/20; H04W 4/50
See application file for complete search history.

(56) References Cited

U.S. PATENT DOCUMENTS

2011/0010279 A1* 1/2011 Tuttle .............. G06Q 10/06
                                                   709/219
2015/0127477 A1* 5/2015 Urquhart ........ G06Q 20/202
                                                   705/305
2022/0298713 A1* 9/2022 Arankalle ............ E05F 3/224

FOREIGN PATENT DOCUMENTS

JP   2000-272563 A     10/2000
KR   10-2004-0105513 A 12/2004
KR   10-2009-0120618 A 11/2009
KR   10-2017-0083851 A  7/2017
KR   10-1876646 B1      7/2018

* cited by examiner

*Primary Examiner* — Michael T Vu
(74) *Attorney, Agent, or Firm* — Muncy, Geissler, Olds & Lowe, P.C.

(57) ABSTRACT

The present invention relates to a method of providing a contactless laundry service including executing an application of a contactless laundry service, receiving a charge system of the contactless laundry service from a user, latching, by the user, a laundry container, into which laundry is put, for the contactless laundry service, and performing, by the user, a collection request using a collection request button of the application.

2 Claims, 2 Drawing Sheets

NON-CONTACT LAUNDRY SERVICE SYSTEM, AND SERVICE-PROVIDING METHOD

BACKGROUND

1. Field of the Invention

The present invention relates to a contactless laundry service system and a method of providing the service.

2. Discussion of Related Art

Washing for restoring an original state of clothes by removing contaminants such as dirt and dust in a physical manner and a chemical manner is divided into two types including water washing (wet washing) of removing contaminants generally using water and a detergent and dry cleaning (dry washing) of removing contaminants using an organic solvent. The water washing may be easily performed at home because it mainly uses water, but the dry cleaning method is mainly professionally performed in a laundry shop because it requires specific equipment and technology, and thus is effective for clothes which have a risk of being damaged by water or detergent or of which a shape of a material may be changed.

Currently, not only washing such as dry cleaning, but also water washing and clothes repair are performed in laundry shops, and laundry shops are becoming more widespread, gradually becoming larger, and becoming specialized and mechanized at the same time.

In such a general laundry shop, there is a method in which a customer visits the laundry shop to drop off laundry and check a laundry schedule, and there is a method in which a laundry shop owner visits a customer's home to collect laundry and present a laundry schedule.

In such methods, the customer visits the laundry shop, or the owner visits the customer's home. Therefore, in a case in which the owner is not present due to delivery when the customer visits the laundry shop, there is inconvenience in that the customer should wait until the owner returns or revisit the laundry shop again later.

In addition, from an owner's perspective, since the owner should visit all customer's homes, time loss and physical pain may occur, and in a case in which the owner delivers laundry, since the owner cannot receive a request for laundry even when the customer visits the laundry shop, there is a problem in that an economic loss occurs.

Generally, a laundry shop is located in a shopping district of an apartment which is a residential area, and a laundry collector of the laundry shop receives a request through a telephone call for the sake of convenience of a resident, visits a customer to collect laundry, or walks around halls of the apartment and shouts to collect laundry at a predetermined time.

However, in the above-described method, since the laundry collector should shout while walking around apartment buildings at the predetermined time, in a case in which residents of the apartment do not respond, there is a disadvantage in that a considerable amount of labor is wasted.

That is, in an apartment including a plurality of houses, since there are more cases in which laundry is taken out at times at which the residents want instead of being taken out by all the residents at a time predetermined by the laundry collector, most laundry collectors waste considerable amounts of labor for the convenience of the residents even while putting up with the inconvenience described above.

Accordingly, a method of leaving laundry in front of a front door may be considered, but such a method has a problem of loss or privacy exposure due to the laundry being seen by others.

SUMMARY OF THE INVENTION

Therefore, the present invention is directed to providing a laundry delivery and collection system allowing busy modern people to use a laundry service without specially sharing a time and without a problem of loss or privacy exposure when using the professional laundry service.

According to an aspect of the present invention, there is provided a method of providing a contactless laundry service including executing an application of a contactless laundry service, receiving a charge system of the contactless laundry service from a user, latching, by the user, a laundry container, into which laundry is put, for the contactless laundry service, and performing, by the user, a collection request using a collection request button of the application.

The receiving of the charge system of the contactless laundry service may include inputting, by the user, a monthly fixed charge service which allows the user to use the contactless laundry service with a preset charge for a predetermined period, and inputting a free use service which is selected to use the contactless laundry service with a charge determined according to the number of pieces of laundry.

The monthly fixed charge service in the inputting of the monthly fixed charge service may include an all-in-one service providing a water washing service and a dress shirt and dry cleaning service of which the number of times is fixed in a predetermined period, a dress shirt & dry service which provides the dress shirt and dry cleaning service of which the number of times is fixed in a predetermined period, a dry only service which provides the dry cleaning of which the number of times is fixed in a predetermined period, a laundry & dry service which provides the water washing and the dry cleaning service of which the number of times is fixed in a predetermined period, and a laundry only service which provides the water washing of which the number of times is fixed in a predetermined period.

According to another aspect of the present invention, there is provided an electronic device including a communication circuit including a power sensor which detects power information of a latching device of a laundry container and a communication module which transmits the power information to a user's smartphone, a memory, and a processor electrically connected to the communication circuit, wherein the processor controls the communication circuit to transmit the power information and available time information of the latching device of the laundry container to a server of a manager through the user's smartphone using calculated information.

The communication circuit may further include a power blocking switch which blocks power supplied to the latching device and the communication module.

The power information obtained from the power sensor may include power efficiency improving data according to whether the power blocking switch operates.

The communication module may transmits release status and time information to the server of the manager at a time point at which the latching device receives a signal from the user's smartphone and is released.

The server of the manager may transmit a control signal to operate the power blocking switch to the communication module in a case in which the server receives releasing data of the latching device.

The processor may transmit the power information collected from the power sensor to the user's smartphone and the server of the manager in real time and transmit a warning message in a case in which an amount of remaining power is smaller than 10% of an amount of the power.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
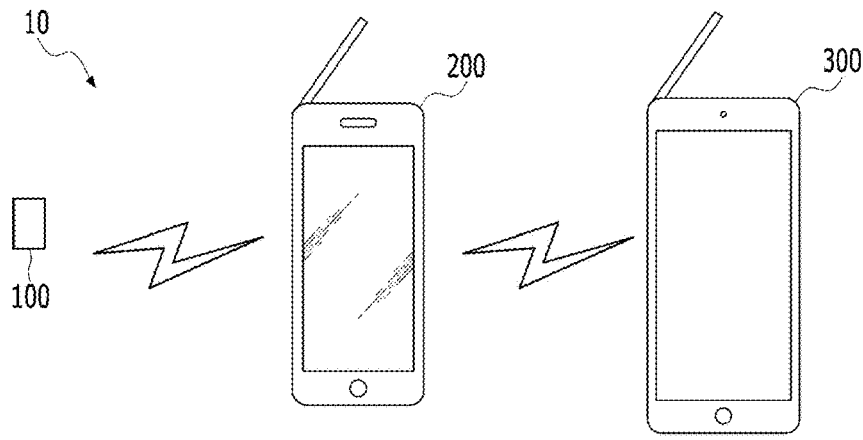
FIG. 1 is a block diagram illustrating a contactless laundry service system according to one embodiment of the present invention.

Embodiments of the present invention are illustrated for the purpose of describing the technical spirit of the present invention. The scope of the present invention is not limited to the embodiments described below or specific descriptions thereof.

Unless otherwise defined, all technical and scientific terms used herein have meanings as customarily understood by those skilled in the art. All the terms used herein are selected for the purpose of more clearly describing the present invention and not for the purpose of limiting the scope of the present invention.

Unless otherwise described, descriptions such as "comprising," "including," and "having" used in the present invention should be understood as open-ended terms having the possibility of including other embodiments.

Unless otherwise described, the singular forms described in the present invention include the plural forms, and this similarly applied to the singular forms described in the claims.

Terms such as "first," "second," and the like used herein are used for distinguishing a plurality of components from each other and do not limit an order or importance thereof.

The term "unit" used in the present embodiment refers to a software or hardware component such as a field-programmable gate array (FPGA) or an application specific integrated circuit (ASIC). However, the term "unit" is not limited to software or hardware. An element described with the term "unit" may be formed to be included in a storage medium capable of addressing or formed to reproduce one or more processors.

Thus, as an example, the term "unit" refers to components including software components, object-oriented software components, class components, task components, processes, functions, properties, procedures, subroutines, segments of a program code, drivers, firmware, micro-codes, circuits, data, databases, data structures, tables, arrays, and variables. Functions provided by these components and the term "unit" may be combined with a smaller number of components and "units" or may be further divided into additional components and "units."

The term "based on" is used for describing one or more factors affecting an action or operation of decision or determination described in a phrase or sentence including the corresponding term and does not preclude an additional factor affecting the action or operation of the decision or determination.

In the present invention, when an element is referred to as being "connected" or "coupled" to another element, it should be understood that the element may be directly connected or coupled to another element or connected or coupled to another element with still another element disposed therebetween.

Hereinafter, embodiments of the present invention will be described with reference the accompanying drawings.

The same reference numeral is assigned to components that are the same or correspond to each other. In addition, when the embodiments are described below, redundant descriptions of the components that are the same or correspond to each other may be omitted. However, this omission of the description of the component is not intended to indicate that such a component is not included in the embodiment.

FIG. 1 is a block diagram illustrating a laundry delivery and collection system according to one embodiment of the present invention.

Referring to FIG. 1, the laundry delivery and collection system according to one embodiment of the present invention includes an electronic tag part 100, a terminal 200, and a service provider terminal 300. Not all the components of the laundry collection management system 10 illustrated in FIG. 1 are essential structural components, and the laundry collection management system 10 may be implemented with more or fewer components than the number of the components illustrated in FIG. 1.

The electronic tag part 100 includes collection tagging information including a message for requesting collection of laundry transmitted from a customer to a business owner.

In addition, the electronic tag part 100 includes a near-field communication (NFC) tag, a barcode, a quick response (QR) code, a radio-frequency identification (RFID) tag, or the like.

In addition, the electronic tag part 100 may be formed to be attachable to and detachable from an interior (including, for example, a living room, a room, a kitchen, or a home appliance) of a house in which a customer resides, a vehicle, or the like.

In addition, the electronic tag part 100 may also include customer information corresponding to the customer.

The terminal 200 may be applied to various terminals such as a smart phone, a portable terminal, a mobile terminal, a personal digital assistant (PDA), a portable multimedia player (PMP) terminal, a telematics terminal, a navigation terminal, a personal computer (PC), a notebook computer, a slate PC, a tablet PC, an ultrabook, a wearable device (including, for example, a smartwatch, a smart glass, and a head mounted display (HMD)), a WiBro terminal, an Internet protocol television (IPTV) terminal, a smart TV, a terminal for digital broadcasting, a TV, a three-dimensional (3D) TV, a home theater system, an audio video navigation (AVN) terminal, an audio/video (A/V) system, and a flexible terminal.

In addition, the terminal 200 reads the electronic tag part 100 to recognize (or obtain) collection tagging information included in the electronic tag part 100.

That is, after the customer puts a laundry storage bag (not shown), into which laundry is put, in a laundry collection container (not shown) installed at a predetermined location to leave the laundry for a laundry worker, the terminal 200 recognizes the collection tagging information by reading the electronic tag part 100.

In this case, the laundry storage bag may be a bag used when the customer leaves laundry for the laundry worker or receives laundry from the laundry worker.

In addition, the laundry collection container is installed at a predetermined location in a neighborhood.

In addition, in the case in which the customer leaves the laundry for the laundry worker, the customer puts the laundry in the laundry storage bag and stores (or puts) the laundry storage bag in the laundry collection container.

The laundry worker collects the laundry storage bag stored in the laundry collection container and washes the laundry in the laundry storage bag.

In addition, the laundry worker puts the washed laundry in the laundry storage bag and directly delivers the laundry storage bag to the customer or delivers the laundry storage bag using the laundry collection container.

In addition, the terminal 200 generates laundry request information based on the collection tagging information. In this case, the laundry request information includes the collection tagging information, identification information of the terminal 200, identification information of the laundry collection container, customer information, laundry input date and time information (including, for example, date and time information), and the like. In this case, the customer information includes an address, a phone number, a name, and the like of the customer. In addition, the laundry input date and time information includes date and time information of a time point at which the collection tagging information is recognized or a time point at which the laundry request information is generated.

In addition, the terminal 200 transmits the generated laundry request information to the service provider terminal 300.

In addition, the terminal 200 receives laundry collection check information of the laundry, which is transmitted from the service provider terminal 300 in response to the transmitted laundry request information.

In addition, the terminal 200 outputs the received laundry collection check information.

In addition, the terminal 200 receives delivery schedule information transmitted from the service provider terminal 300. In this case, the delivery schedule information includes the identification information of the laundry collection container included in the laundry request information corresponding to the laundry left by the customer (or user) of the terminal 200, location information (or map information) corresponding to the identification information of the laundry collection container, expected delivery date information, and the like.

In addition, the terminal 200 outputs the received delivery schedule information.

In addition, in a case in which the corresponding laundry cannot be received according to a delivery schedule included in the delivery schedule information or a change in the delivery schedule is to be requested, the terminal 200 generates delivery schedule change information. In this case, the delivery schedule change information includes changed schedule information to be changed, identification information of the terminal 200, the identification information of the laundry collection container, and the like.

In addition, the terminal 200 transmits the generated delivery schedule change information to the service provider terminal 300.

The service provider terminal 300 may be applied to various terminals such as a smart phone, a portable terminal, a mobile terminal, a PDA, a PMP terminal, a telematics terminal, a navigation terminal, a PC, a notebook computer, a slate PC, a tablet PC, an ultrabook, a wearable device, a WiBro terminal, an IPTV terminal, a smart TV, a terminal for digital broadcasting, a TV, a 3D TV, a home theater system, an AVN terminal, an A/V system, and a flexible terminal.

In addition, the service provider terminal 300 receives the laundry request information transmitted from the terminal 200.

In addition, the service provider terminal 300 outputs the received laundry request information.

Accordingly, a business owner (or laundry worker) using the service provider terminal 300 may check a laundry request from the customer.

In addition, the service provider terminal 300 accumulates (or generates/obtains) count information of laundry collected from each laundry collection container based on the received laundry request information. In this case, the service provider terminal 300 may accumulate the count information of the laundry for each laundry collection container (or count information of the laundry collected from each laundry collection container) based on the laundry request information transmitted from each of one or more other terminals (not shown) in addition to the terminal 200.

In this case, the service provider terminal 300 stores the location information (or map information) corresponding to the identification information of the laundry collection container.

In addition, the service provider terminal 300 generates the laundry collection check information indicating that the laundry request information transmitted from the terminal 200 has been received normally (or a laundry request of the customer has been checked).

In addition, the service provider terminal 300 transmits the generated laundry collection check information to the terminal 200 in response to the received laundry request information.

In addition, in a case in which the count information accumulated for each laundry collection container is greater than a preset value, the service provider terminal 300 generates alarm information. In this case, the alarm information includes the identification information of the laundry collection container corresponding to the count information which is greater than the preset value.

In addition, the service provider terminal 300 outputs the generated alarm information.

In addition, after the corresponding laundry is completely washed, the service provider terminal 300 generates the delivery schedule information. In this case, the delivery schedule information includes the identification information of the laundry collection container included in the laundry request information corresponding to the corresponding laundry, the location information (or map information) corresponding to the identification information of the laundry collection container, expected delivery date information, and the like.

In addition, the service provider terminal 300 transmits the generated delivery schedule information to the terminal 200 based on the identification information of the terminal

200 included in the laundry request information corresponding to the corresponding laundry.

That is, in a case in which the business owner puts the completely washed laundry in the laundry collection container, the service provider terminal 300 generates the delivery schedule information and transmits the generated delivery schedule information to the terminal 200.

In addition, in a case in which the business owner wants to directly deliver the completely washed laundry to the customer at a preset time point, the service provider terminal 300 generates the delivery schedule information and transmits the generated delivery schedule information to the terminal 200.

In addition, the service provider terminal 300 receives the delivery schedule change information transmitted from the terminal 200 in response to the transmitted delivery schedule information.

In addition, the service provider terminal 300 outputs the received delivery schedule change information.

In addition, the service provider terminal 300 updates (or modifies/changes) the delivery schedule information based on the received delivery schedule change information.

In the embodiment of the present invention, it is described that the service provider terminal 300 directly communicates with the terminal 200, but the present invention is not limited thereto and may also further include a server (not shown) provided between the terminal 200 and the service provider terminal 300.

As described above, in the case in which the server is provided between the terminal 200 and the service provider terminal 300, some functions of the service provider terminal 300 may also be performed by the server.

That is, the server may receive the laundry request information transmitted from each of one or more terminals 200, accumulate the count information of collected laundry in each laundry collection container based on the received laundry request information, generate alarm information in a case in which the accumulated count information is greater than a preset value, and transmit the generated alarm information to the service provider terminal 300.

In addition, the server may transmit the delivery schedule information transmitted from the service provider terminal 300 to the corresponding terminal 200 and transmit the delivery schedule change information transmitted from the terminal 200 to the service provider terminal 300.

As described above, when the customer wants to leave laundry for a laundry shop in a simple manner using the laundry collection container provided at a preset location, the service provider terminal may be notified of a laundry request state through the electronic tag.

In addition, as described above, the service provider can simply check the number of pieces of requested laundry and collect the laundry at a proper time using the laundry collection container provided at the preset location.

In addition, as described above, the customer can simply check a delivery schedule of laundry and ask for a change in a delivery schedule as necessary.

Figure 2:
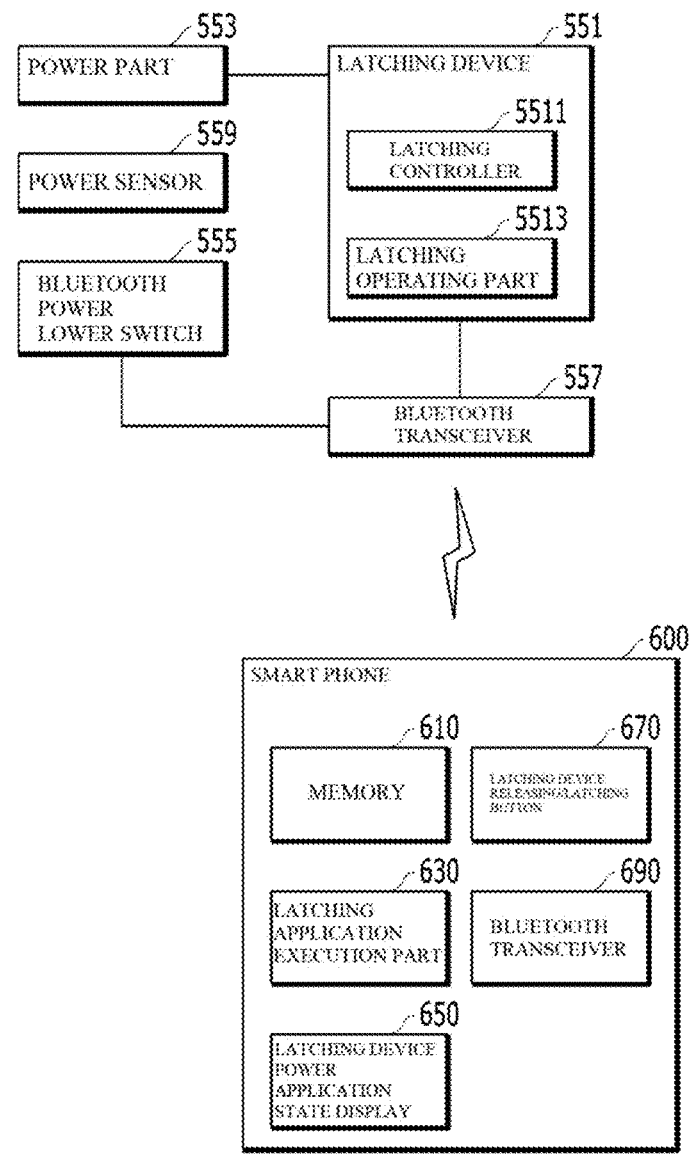
FIG. 2 is a block diagram illustrating a structure of a notification system of the contactless laundry service system according to one embodiment of the present invention.

FIG. 2 is a block diagram illustrating a structure of a notification system of a laundry delivery and collection system according to one embodiment of the present invention.

Referring to FIG. 2, the essential objective of the present invention that the laundry container should be simply latched or released using a smartphone of the user so that the user may receive laundry at any time in a state in which the laundry container according to one embodiment of the present invention is left in a latched state in front of a user's door may be achieved.

Accordingly, the laundry container according to one embodiment of the present invention may include a latching device 551, a power part 553 which supplies power to the latching device 551, a power sensor 559 which detects remaining power of the power part 553, and a Bluetooth transceiver 557 which transmits/receives a signal to/from a smartphone 600 of the user.

In addition, the latching device 551 may include a latching controller 5511 which controls the latching device and a latching operating part 5513 which performs a latching operation according to a control signal of the latching controller 5511.

The power sensor 559 may serve to detect the remaining power of the power part 553 and transmit information about the detected power of the power part 553 to the Bluetooth transceiver 557, and the information of the power of the power part 553 transmitted to the Bluetooth transceiver 557 may be transmitted to a Bluetooth transceiver 690 of the smartphone 600.

As described above, the information of the power of the power part 553 transmitted to the smartphone 600 of the user may be transmitted to a server of a manager through the Internet in real time in a case in which the user executes an application, and the manager may manage the remaining power of the power part 553 of the laundry container in real time.

Meanwhile, the laundry container of the present invention may further include a Bluetooth power blocking switch 555 capable of blocking power transmitted to the latching device 551 and the Bluetooth transceiver 557 from the power part 553.

Since the Bluetooth power blocking switch 555 may block the power transmitted to the latching device 551 and the Bluetooth transceiver 557 normally, the power is blocked from being transmitted to the latching device 551 or the Bluetooth transceiver 557, and thus there is an effect in that power consumption in a standby state can be minimized.

One embodiment of an operation of the latching device of the laundry container will be described simply. The user may execute a latching application execution part 630 provided in the smartphone 600 of the user to execute a latching application which controls the latching device of the laundry container, and in this case, the user may check whether power is applied to the latching device through a latching device power application state display 650.

When the user operates a latching device releasing/latching button 670, a control signal is transmitted to the Bluetooth transceiver 557 of the latching device through the Bluetooth transceiver 690 of the smartphone.

When the control signal is transmitted to the Bluetooth transceiver 557 of the latching device, the Bluetooth power blocking switch 555 is released so that a standby state of the latching device is released, the control signal is transmitted to the latching controller 5511 of the latching device 551, and the latching controller 5511 operates the latching operating part 5513 according to the control signal.

As described above, by the user simply operating the smartphone 600, latching of the laundry container according to one embodiment of the present invention may be released or set.

FIG. 2 is a block diagram illustrating a configuration of the laundry container and the smartphone used in the contactless laundry service system according to one embodiment of the present invention.

Referring to FIG. 2, the essential objective of the present invention that the laundry container should be simply latched or released using a smartphone of the user so that the user may receive laundry at any time in a state in which the laundry container according to one embodiment of the present invention is left in a latched state in front of a user's door may be achieved.

Accordingly, the laundry container according to one embodiment of the present invention may include a latching device 551, a power part 553 which supplies power to the latching device 551, a power sensor 559 which detects remaining power of the power part 553, and a Bluetooth transceiver 557 which transmits/receives a signal from a smartphone 600 of the user.

In addition, the latching device 551 may include a latching controller 5511 which controls the latching device and a latching operating part 5513 which performs a latching operation according to a control signal of the latching controller 5511.

The power sensor 559 may serve to detect the remaining power of the power part 553 and transmit information about the detected power of the power part 553 to the Bluetooth transceiver 557, and the information of the power of the power part 553 transmitted to the Bluetooth transceiver 557 may be transmitted to a Bluetooth transceiver 690 of the smartphone 600.

As described above, the information of the power of the power part 553 transmitted to the smartphone 600 of the user may be transmitted to a server of a manager through the Internet in real time in a case in which the user executes an application, and the manager may manage the remaining power of the power part 553 of the laundry container in real time.

Meanwhile, the laundry container of the present invention may further include a Bluetooth power blocking switch 555 capable of blocking power transmitted to the latching device 551 and the Bluetooth transceiver 557 from the power part 553.

Since the Bluetooth power blocking switch 555 may block the power transmitted to the latching device 551 and the Bluetooth transceiver 557 normally, the power is blocked from being transmitted to the latching device 551 or the Bluetooth transceiver 557, and thus there is an effect in that power consumption in a standby state can be minimized.

One embodiment of an operation of the latching device of the laundry container will be described simply. The user may execute a latching application execution part 630 provided in the smartphone 600 of the user to execute a latching application which controls the latching device of the laundry container, and in this case, the user may check whether power is applied to the latching device through a latching device power application state display 650.

When the user operates a latching device releasing/latching button 670, a control signal is transmitted to the Bluetooth transceiver 557 of the latching device through the Bluetooth transceiver 690 of the smartphone.

When the control signal is transmitted to the Bluetooth transceiver 557 of the latching device, the Bluetooth power blocking switch 555 is released so that a standby state of the latching device is released, the control signal is transmitted to the latching controller 5511 of the latching device 551, and the latching controller 5511 operates the latching operating part 5513 according to the control signal.

As described above, by the user simply operating the smartphone 600, latching of the laundry container according to one embodiment of the present invention may be released or set.

Figure 3:
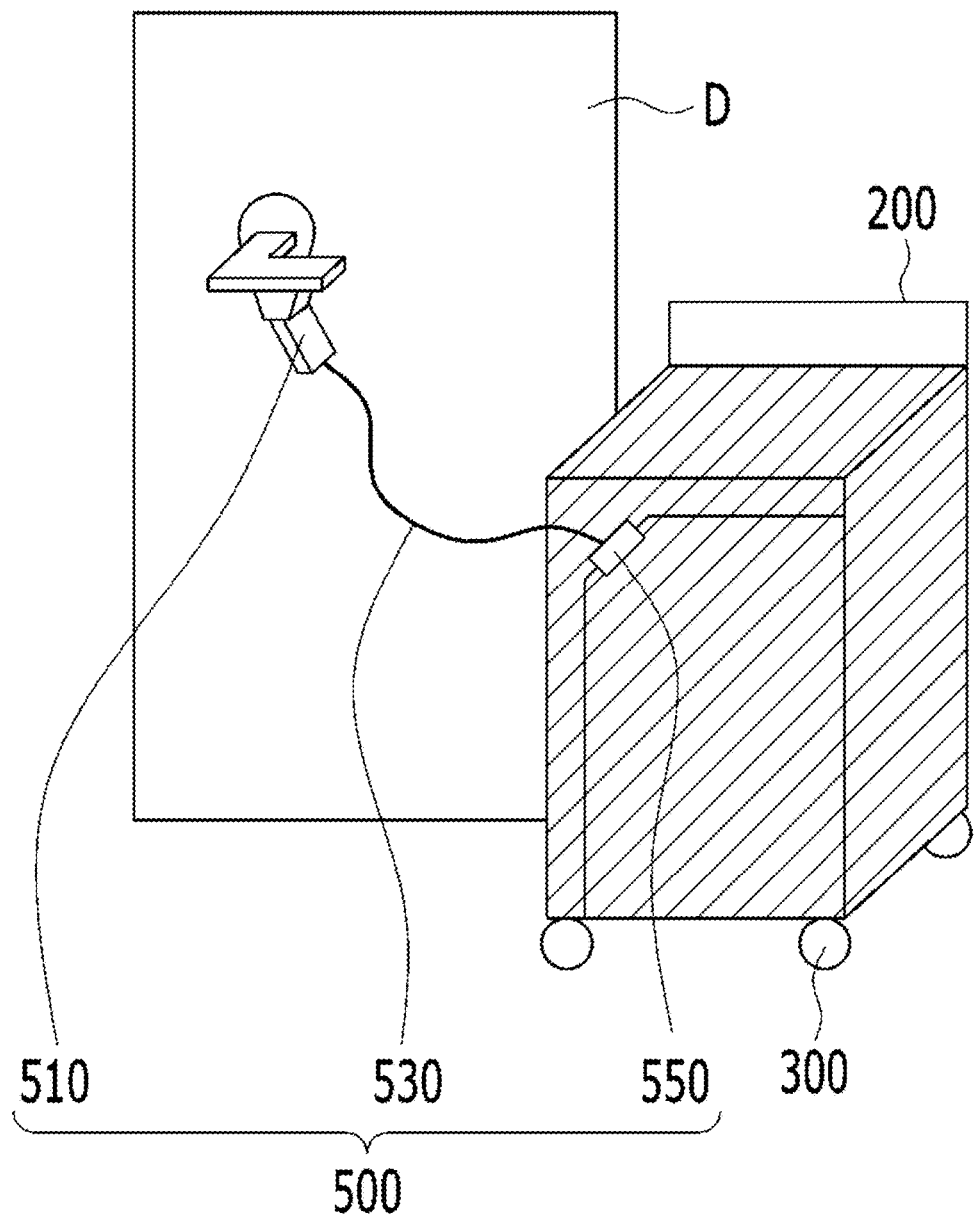
FIG. 3 is a view illustrating that a laundry container for implementing the contactless laundry service system according to one embodiment of the present invention is installed to be latched to a door of a user.

FIG. 3 is a view illustrating that the laundry container for implementing the contactless laundry service system according to one embodiment of the present invention is installed to be latched to a door of the user.

Referring to FIG. 3, the laundry container of the present invention may include a wire 530 connected to a laundry latching device 550 in a state in which the laundry container is restricted from being exposed to the outside by the laundry latching device 550 and a handle latching device 510 which is connected to the wire 530 and locks the wire and a handle of a door D provided at a user's house.

As described above, since lives of modern people are so busy, cases in which completely washed laundry should be left in front of the user's door occur.

In such cases, there is a possibility of the laundry container left in front of the door being lost, and in a case in which there is no latching device of the laundry, there is also a possibility of the laundry accommodated in the laundry container being lost.

In order to prevent such problems, the handle latching device 510 serves to latch a connection of the laundry container and the user's door, and the laundry latching device 550 serves to latch the laundry container.

Accordingly, the problems of the laundry container and laundry accommodated in the laundry container being lost may be prevented.

As described above, the laundry container may be provided so that the user can use the smartphone to perform both latching and releasing functions of the laundry latching device 550 and the handle latching device 510.

More specifically, since the laundry latching device 550 is configured to communicate with the smartphone via Bluetooth, the user or collector may latch or release the laundry latching device 550 using a mobile communication device capable of communicating with the laundry latching device 550.

In addition, the present invention may further include a physical key in order to latch or release the laundry latching device 550 even in a state in which communication with the laundry latching device 550 is unstable or the laundry latching device 550 cannot be used because there is no power.

Although the above method has been described with reference to the specific embodiments, the method may be implemented as computer readable codes in a computer readable recording medium. The computer readable recording medium includes any data storage device in which computer readable data is stored. Examples of the computer readable recording medium include a read-only memory (ROM), a random-access memory (RAM), a compact disc (CD)-ROM, a magnetic tape, a hard disk, a floppy disk, an optical data storage device, and the like. In addition, the computer readable recording medium may be distributed over network-coupled computer systems so that the computer readable code can be stored and executed in a distributive manner. In addition, functional programs, codes, and code segments for implementing the embodiments may be easily construed by programmers skilled in the art to which the present invention belongs.

According to the present invention, a laundry delivery and collection system can be provided to allow busy modern people to use a laundry service without specially sharing a time and without a problem of loss or privacy exposure when using the professional laundry service.

Although the technical spirit of the present invention has been described above with reference to some embodiments and the accompanying drawings, it should be apparent that various substitutions, modifications, and changes are possible without departing from the technical spirit and the range, which are understandable to those skilled in the art, of the present invention. In addition, the substitutions, modifications, and changes should be considered to be included in the appended claims.

INDUSTRIAL APPLICABILITY

The present invention is industrially applicable to the field of a contactless laundry service.

What is claimed is:

1. A method of providing a contactless laundry service, comprising:

執行 an application of a contactless laundry service;

receiving a charge system of the contactless laundry service from a user;

latching, by the user, a laundry container, into which laundry is put, for the contactless laundry service; and performing, by the user, a collection request using a collection request button of the application;

wherein the receiving of the charge system of the contactless laundry service includes:

inputting, by the user, a monthly fixed charge service which allows the user to use the contactless laundry service with a preset charge for a predetermined period; and inputting a free use service which is selected to use the contactless laundry service with a charge determined according to the number of pieces of laundry.

2. The method of claim 1, wherein the monthly fixed charge service in the inputting of the monthly fixed charge service includes: an all-in-one service providing a water washing service and a dress shirt and dry cleaning service of which the number of times is fixed in a predetermined period; a dress shirt & dry service which provides the dress shirt and dry cleaning service of which the number of times is fixed in a predetermined period; a dry only service which provides the dry cleaning of which the number of times is fixed in a predetermined period; a laundry & dry service which provides the water washing and the dry cleaning service of which the number of times is fixed in a predetermined period; and a laundry only service which provides the water washing of which the number of times is fixed in a predetermined period.

* * * * *